June 11, 1929.   J. COHEN   1,716,622
CONTAINER FOR VACUUM FLASKS OR THE LIKE
Filed Feb. 9, 1928
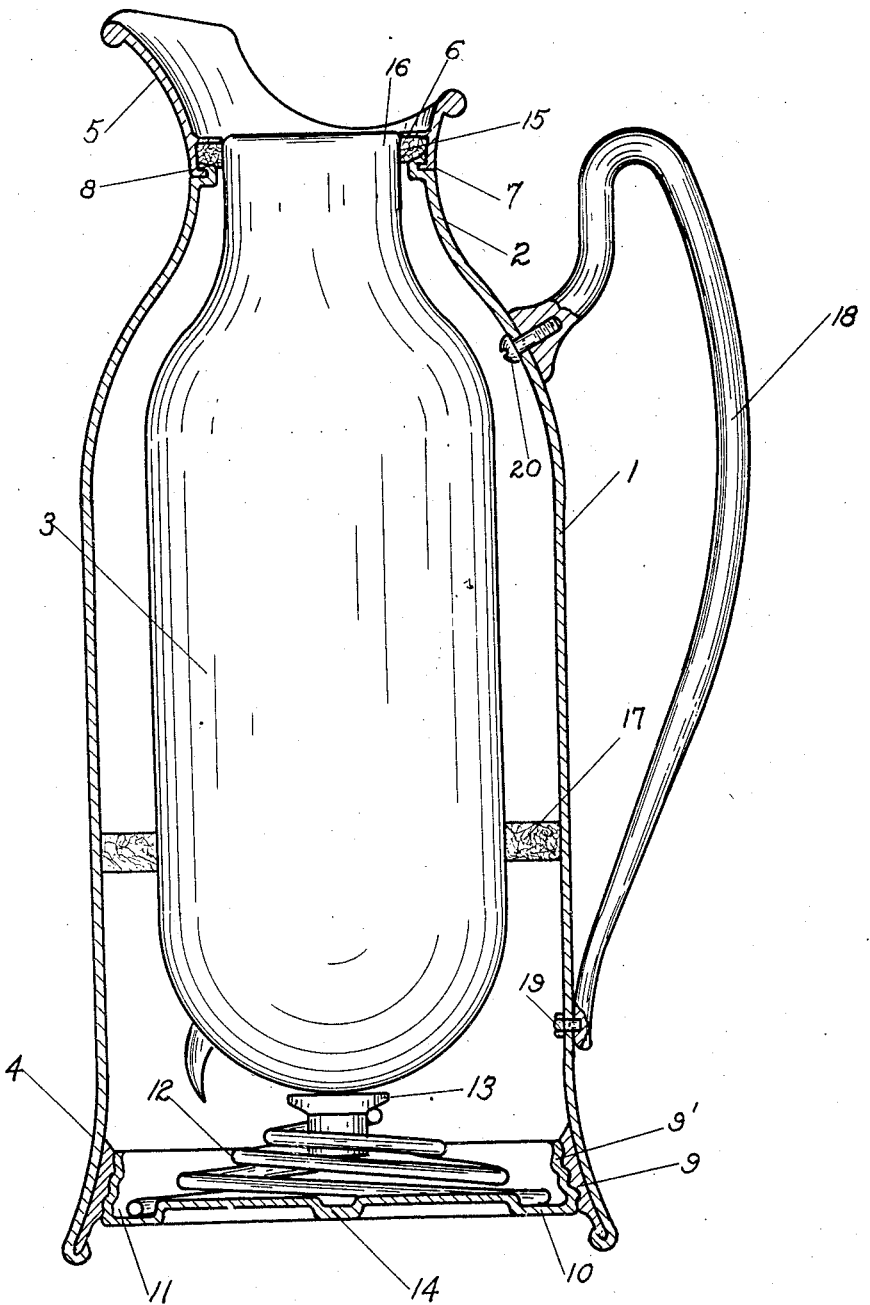
Inventor
JOSEPH COHEN
By Manuel C. Rosa
Attorney Patented June 11, 1929.

1,716,622

UNITED STATES PATENT OFFICE.

JOSEPH COHEN, OF TAUNTON, MASSACHUSETTS.

CONTAINER FOR VACUUM FLASKS OR THE LIKE.

Application filed February 9, 1928. Serial No. 253,197.

My invention relates to a novel container for a vacuum flask which has the appearance of a pitcher and a handle thereon by which it may be easily carried.

It is a well known fact, in the metallurgical art, that aluminum is practically nonsolderable and nonelectroplatable, nevertheless, the value of aluminum in the making of household utensils and other containers is great, not only because of its lightness but also because of its ease of fabrication. It therefore becomes necessary where a lip plated with nickel or other suitable metallic coating is desired to utilize a lip member of a platable material such as britannia metal.

I have found that by using a peculiarly constructed lip member of a platable material that I am enabled to make a container of a pitcher-like contour wherein the lip may be secured to the aluminum casing by swaging the rim of the casing onto and over a flange provided on the lip member. The handle portion and the bottom portion may be secured to the aluminum casing as shown in the drawing.

It is an object of my invention to provide an artistic container of a very light material, such as aluminum, having a nickel plated lip secured thereto at one end and a removable bottom provided at the other end whereby the vacuum flask may be inserted and removed with ease.

It is another object of my invention to provide an aluminum casing for containing a vacuum flask which is so designed as to hold the bottle against breakage and having cushioning means at the base of the bottle, the rim of the bottle and adjacent the mid portion of the bottle.

Other objects and advantages will appear from the following description taken in connection with the accompanying drawing.

I attain these objects and advantages by means of the container illustrated in the drawing wherein the figure shown is a cross-sectional view of the container with the full showing of the vacuum flask.

Referring to the drawing, 1 is the aluminum casing which has a substantially cylindrical appearance being opened at both ends. At the upper end 2 the sides converge to provide an opening sufficient to receive the neck of the vacuum flask 3. The sides of the casing at the lower extremity 4 is slightly flared outwardly to provide an artistic appearance as well as a more stable base.

The lip member 5 has a circular base of substantially the same diameter as the opening at the upper end 2 of the casing and is provided with two annular flanges 6 and 7 which are substantially parallel to each other, the flange 6 projecting beyond the flange 7. The upper flange 6 is of such a width that it allows the neck of the flask to project slightly while still engaging and holding the same. As before stated, the casing is to be made of aluminum and the lip may be made of britannia or other suitable metal which may be plated.

In order to secure the lip member to the casing the rim of the upper end 2 is swaged onto the lower flange 7 as shown at 8. This form of securement is made necessary in view of the fact that aluminum resists the ordinary soldering operation. The lip, when secured in place in the manner stated, forms a very good union and presents a highly artistic appearance without. The lower end of the casing 1 is provided on its interior with a threaded ferrule 9. The removable bottom 10 is provided with a vertical annular flange 9′ which is threaded to mesh with the threads of the ferrule 9. The bottom 10 is provided with an annular channel 11 upon which the cushioning spring 12 is made to rest. The spring 12 tapers towards the top and is provided with a resilient cup member 13 at its apex which rests against the bottom of the vacuum flask and forces the vacuum flask towards the lip member when the bottom 10 is secured into the casing. The bottom member 10 is also provided with a grip member 14 which consists of a rib stamped out of the bottom member, as shown in the drawing and which may be easily manipulated by the hand to insert or remove the bottom member.

A rubber cushioning means 15 of a rectangular cross section is provided on the upper portion of the casing within the clearance formed by the upper flange 6 and the flange 8 of the casing and pushes against the neck 16 of the vacuum flask 3. It will be appreciated that when the flask is inserted in place and the bottom member 10 applied to the casing that the inward pressure exerted against the flask will cause the cushioning means 15 to be securely held between the flanges and simultaneously hug the neck of the flask thereby securely holding the flask against vertical displacement. An annular spacer 17 of any suitable material may be provided adjacent the mid portion of the flask to insure the proper alignment of the flask within the casing. The handle member 18 which may consist of a platable metal is secured to the casing by means of the bolts 19 and 20.

By means of the structural arrangement above set forth, I am enabled to produce a casing for a vacuum bottle which consists for the most part of aluminum while yet having a plated lip and handle. As the aluminum may be colored with the lacquers familiar to the art it will be appreciated that pleasing color schemes are possible which are set off by the nickel plated lip, as well as the handle member if desired. The proposed form of union between the lip and the casing avoids the obstacle ordinarily presented when it is attempted to join aluminum with other metals. It is to be understood that I do not wish to be limited to aluminum, as the union may be applied to other metals whether solderable or non-solderable.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure or substitution of equivalents which utilize the principle of my invention and fall within the purview of my invention and are within the spirit and scope of the following claims.

The invention having been set forth what is claimed as new and useful is:

1. A container for vacuum flasks or the like, comprising in combination a substantially cylindrical aluminum casing, the upper end of said aluminum casing converging inwardly and the lower end thereof flaring outwardly, a lip member, said lip member having a flange, the upper end of said casing being swaged onto said flange to secure the lip member in place.

2. A container for vacuum flasks or the like, comprising in combination a metallic casing having a flange at its upper end, a lip member secured to said casing, said lip member having two substantially parallel annular flanges, the flange of said metallic casing being swaged onto the lower flange of said lip member, a cushioning means between said flanges, and a cushioning means at the base of said casing for supporting a vacuum flask.

3. A container for vacuum flasks or the like, comprising an aluminum casing opened at both ends, a lip member having an annular flange, said aluminum casing having a right angular flange at its upper end, said right angular flange being swaged onto said annular flange.

Signed at Fall River in the county of Bristol, State of Massachusetts, this second day of February, 1928.

JOSEPH COHEN.